United States Patent
Tsunoda

(10) Patent No.: US 7,017,659 B2
(45) Date of Patent: Mar. 28, 2006

(54) VEHICLE AIR-CONDITIONING SYSTEM

(75) Inventor: Isao Tsunoda, Wako (JP)

(73) Assignee: Honda Giken Kogyo Kabushiki Kaisha, Minato-ku (JP)

(*) Notice: Subject to any disclaimer, the term of this patent is extended or adjusted under 35 U.S.C. 154(b) by 0 days.

(21) Appl. No.: 11/062,298

(22) Filed: Feb. 16, 2005

(65) Prior Publication Data

US 2005/0217291 A1 Oct. 6, 2005

(30) Foreign Application Priority Data

Apr. 2, 2004 (JP) .............................. 2004-110332

(51) Int. Cl.
  *B60H 1/00* (2006.01)
  *B60H 3/00* (2006.01)
  *F24F 11/00* (2006.01)
  *F25B 29/00* (2006.01)

(52) U.S. Cl. .................... 165/202; 165/42; 165/43; 165/103; 236/13; 236/91 E; 236/91 F; 237/12.3 A; 237/12.3 B; 454/156; 454/160; 454/161

(58) Field of Classification Search ................ 165/202, 165/42, 43, 103; 236/13, 91 E, 91 F; 237/12.3 A, 237/12.3 B; 454/156, 160, 161
See application file for complete search history.

(56) References Cited

U.S. PATENT DOCUMENTS 4,994,958 A * 2/1991 Iida .............................. 701/36

5,152,335 A * 10/1992 Doi et al. ................... 165/204

FOREIGN PATENT DOCUMENTS

| JP | 56-82626 | | | 7/1981 |
|---|---|---|---|---|
| JP | 64085808 | A | * | 3/1989 |
| JP | 05201233 | A | * | 8/1993 |
| JP | 05278433 | A | * | 10/1993 |
| JP | 06270644 | A | * | 9/1994 |
| JP | 07156638 | A | * | 6/1995 |
| JP | 08258543 | A | * | 10/1996 |
| JP | 11254943 | A | * | 9/1999 |

* cited by examiner

Primary Examiner—John K. Ford
(74) Attorney, Agent, or Firm—Hamre, Schumann, Mueller & Larson, P.C.

(57) ABSTRACT

A vehicle air-conditioning system adjusts the temperature at an outlet by a combined amount of air flowing through a first bypass passage adjusted by an air mixing door and air flowing through a second bypass passage adjusted by a cool air adjusting door independently of the first bypass. A cool air adjusting door control unit adjusts the opening of the cool air adjusting door so that the temperature detected by a discharge temperature sensor comes closer to a target discharge temperature for precise control of discharge temperature, and also causes the cool air adjusting door to be fully open when the opening of the air mixing door determined by an air mixing door opening setting unit is equal to or smaller than a predetermined degree of opening, so as to maintain a steady amount of air discharged from the outlet.

2 Claims, 4 Drawing Sheets

VEHICLE AIR-CONDITIONING SYSTEM

FIELD OF THE INVENTION

The present invention relates to vehicle air-conditioning systems, and more particularly, to vehicle air-conditioning systems adapted-to increase the precision with which to control discharge temperature, and to provide a steady amount of air.

BACKGROUND OF THE INVENTION

Vehicles such as automobiles are equipped with air-conditioning systems for maintaining a good temperature environment in a passenger compartment, regardless of the outside air temperature and the like. The vehicle air-conditioning system normally includes several outlets in a panel in front of a driver's seat and a front passenger seat. The vehicle air-conditioning system adjusts a discharge temperature to a target discharge temperature as appropriate, so as to maintain the temperature in the passenger compartment at an optimum temperature.

The adjustment of the discharge temperature is performed by adjusting the opening of an openable-closable air mixing door disposed between an evaporator and a heater core within an air-conditioning duct, and adjusting the mixing ratio between hot air (heated air) and cool air (unheated air). The air mixing door provided upstream of the heater core has the function of dividing air passing through the air-conditioning duct into heated air and unheated air.

As a means for precisely adjusting a discharge temperature to a target discharge temperature at outlets of a vehicle air-conditioning system, a vehicle air-conditioning control device disclosed in JP-A-56-82626 is known, for example. This vehicle air-conditioning control device includes a temperature sensor provided at an outlet, and compares an actual discharge temperature detected by the temperature sensor with a target discharge temperature set by a control system, and adjusts the opening of an air mixing door so that the actual discharge temperature comes close to the target discharge temperature.

When the actual discharge temperature is feedback controlled to the target discharge temperature by adjusting the opening of the air mixing door in the vehicle air-conditioning control device, as shown in the above 56-82626 publication, the following problems will arise:

The temperature of a heater core on the high-temperature side depends on the water temperature in an engine, and is greatly different from the temperature of an evaporator on the low-temperature side. That is, there is a great temperature difference between cool air supplied from the evaporator and hot air passing through the heater core under the dividing operation of the air mixing door. When the opening of the air mixing door is changed based on the feedback control to divide air passing from the evaporator to the heater core into heated air (hot air) and unheated air (cool air), the discharge temperature is greatly changed relative to the change in the opening of the air mixing door. That is, since the amount of air heated by the downstream heater core and the amount of air as cool air are determined solely by the air mixing door, a great temperature change occurs in an adjustment to a target discharge temperature, resulting in rough adjustment. In other words, the feedback control in the related art chiefly divides air into heated air and unheated air solely by the air mixing door, and thus cannot perform fine adjustment of temperature, leaving a problem that precise control of discharge temperature cannot be performed.

In this connection, the inventor has previously presented in Japanese Patent Application No. 2003-315771 (dated Sep. 8, 2003) corresponding to U.S. application Ser. No. 10/937,582, filed Sep. 8, 2004, now U.S. Pat. No. 6,945,323, a vehicle air-conditioning system which solves the above problem. This vehicle air-conditioning system is provided with a cool air adjusting door in addition to an air mixing door to increase precision in discharge temperature control. In other words, in addition to a cool air supply passage formed depending on the opening of the air mixing door, another passage through which cool air can also be supplied is provided so as to increase the amount of cool air. With this, when cool air is mixed with high-temperature hot air which is greatly different in temperature from the cool air, an appropriate amount of cool air can be supplied to increase precision in discharge temperature control.

However, the vehicle air-conditioning system in 2003-315771 leaves room for improvement as will be described below. With the structure of this vehicle air-conditioning system, when the opening of the air mixing door is small and close to a fully-closed state, there is little airflow passing through a heater core, and thus the discharge temperature is near the temperature of air passing through the cool air adjusting door. Therefore the adjustment of the cool air adjusting door only provides a small change in discharge temperature. This indicates a stable discharge temperature. On the other hand, as is typical in feedback control, the discharge temperature is compared with a target discharge temperature, and the position of the cool air adjusting door is adjusted so that the temperature difference falls within a predetermined range. Therefore, the cool air adjusting door can take any position in the range from a fully-closed position to a fully-open position. As a result, when the cool air adjusting door is opened, a first bypass passage formed by the air mixing door in a fully-closed state and a second bypass passage formed by the cool air mixing door in an open state are both open, resulting in a large amount of air supplied from an outlet. When the cool air adjusting door is closed, the second bypass passage is narrowed, resulting in a small amount of airflow supplied from the outlet.

With the above vehicle air-conditioning system, when the opening of the air mixing door is small, the amount of air discharged from the outlet is not steady, as described above. It is thus required for the vehicle air-conditioning system in the related art configured to control the opening of the air mixing door to bring a discharge temperature close to a target discharge temperature, to remedy rough temperature control due to a large temperature difference between hot air and cool air.

For these reasons, there is a desire for an improved air-conditioning system which can reduce a temperature change in adjustment for good precision, and stabilize the amount of air discharged from outlet even when the opening of an air mixing door is small.

SUMMARY OF THE INVENTION

According to the present invention, there is provided a vehicle air-conditioning system including an air-conditioning duct with an outlet, an air-cooling evaporator and an air-heating heater core which are disposed in the air-conditioning duct, an air mixing door for dividing air passing through the air-conditioning duct into heated air passing through the heater core and into unheated air bypassing the heater core, the air mixing door defining a first bypass passage, a discharge temperature sensor for detecting the temperature of air at the outlet, and a control device for performing feedback control to bring the temperature detected by the discharge temperature sensor closer to a target discharge temperature, the air-conditioning system comprising: a second bypass passage different from the first bypass passage; a cool air adjusting door for adjusting the amount of air flowing through the second bypass passage; an air mixing door opening setting means for setting the degree of opening of the air mixing door so that air having the target discharge temperature is obtained, with the cool air adjusting door open at an initial degree of opening; and a cool air adjusting door control means for controlling the opening of the cool air adjusting door so that the temperature detected by the discharge temperature sensor comes closer to the target discharge temperature, wherein the cool air adjusting door control means causes the cool air adjusting door to be fully open when the degree of opening of the air mixing door determined by the air mixing door opening setting means is equal to or smaller than a predetermined degree of opening.

The vehicle air-conditioning system in this invention is configured to adjust the amount of unheated air cooled by the evaporator by a combined amount of air flowing through the original first bypass passage adjusted by the air mixing door and air flowing through the new second bypass passage adjusted by the newly added cool air adjusting door. Since the cool air adjusting door control unit controls the opening of the cool air adjusting door so that the temperature detected by the discharge temperature sensor comes closer to the target discharge temperature, precise adjustment can be made by the cool air adjusting door, and precise control of the discharge temperature becomes possible. The cool air adjusting door control unit causes the cool air adjusting door to be fully open when the opening of the air mixing door determined by the air mixing door opening setting unit is equal to or lower than the predetermined degree of opening. This control keeps the opening of the cool air adjusting door constant, thus allowing the amount of air discharged from the outlet to be kept steady.

The vehicle air-conditioning system in the present invention, in which the amount of unheated air is adjusted by a combined amount of air flowing through the first bypass passage and the second bypass passage as described above, provides the following advantages: a temperature change in adjustment can be reduced; the temperature of air at the outlet through which air is discharged into a passenger compartment can be controlled with good precision; resistance to air flowing through the second bypass passage can be kept small to provide a steady amount of air through the outlet. In this state, when the need for cooling becomes greater and the volume of air supplied from a fan starts increasing, the open second bypass passage smoothly accommodates to the increase in air volume to deliver the air therethrough.

The initial degree of opening of the cool air adjusting door is preferably set closer to full opening as the opening of the air mixing door determined by the air mixing door opening setting means becomes closer to the predetermined degree of opening. When the opening of the air mixing door gradually comes close to the predetermined degree of opening, the cool air adjusting door is gradually brought to full opening as described above. The cool air adjusting door can thus be brought to a fully open state without being moved greatly. Also, when the air mixing door reaches the predetermined degree of opening, a change in the amount of air before and after that time can be small.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
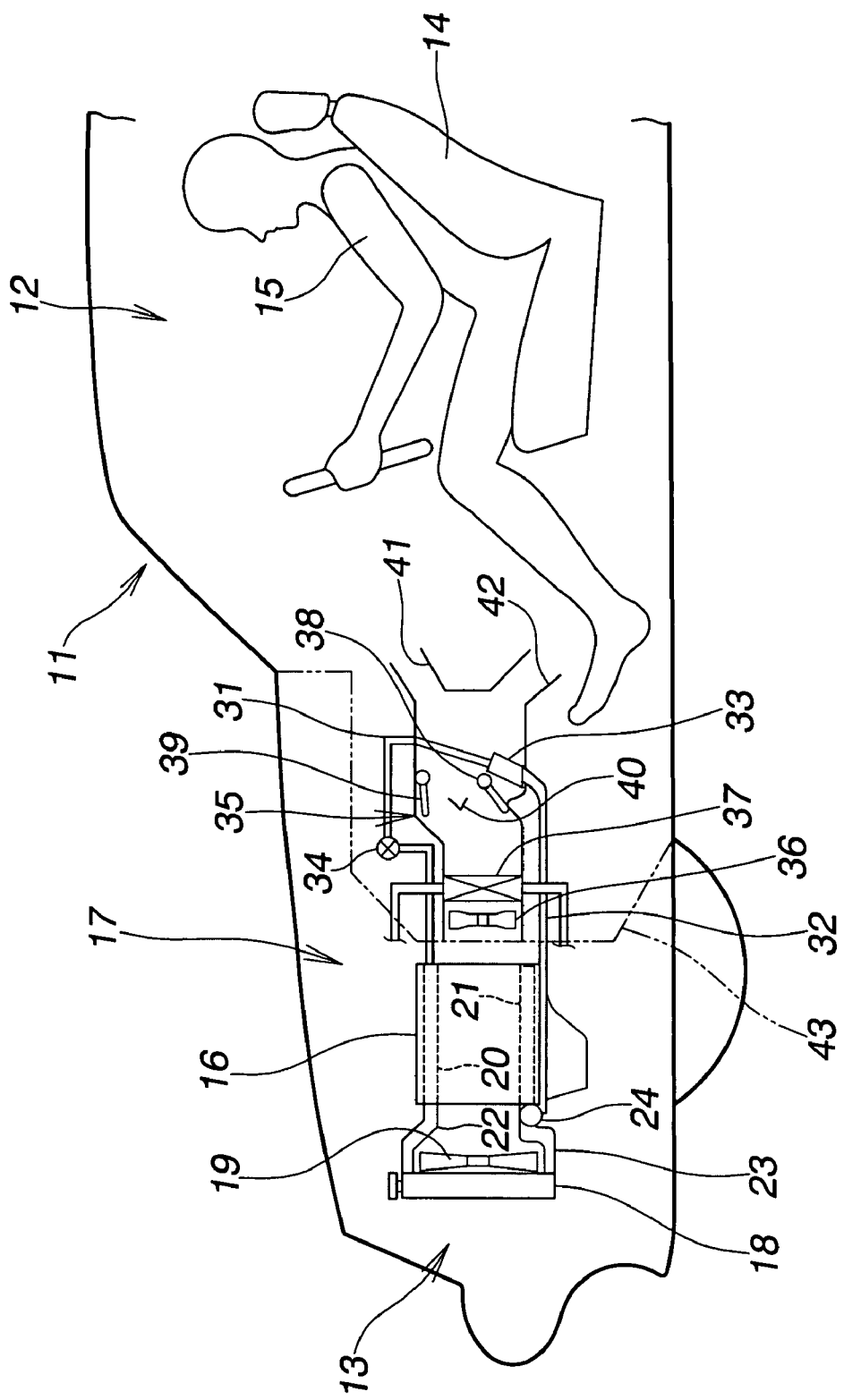
FIG. 1 is a diagram schematically illustrating the front half structure of a vehicle equipped with a vehicle air-conditioning system according to the present invention, when viewed from the side.

Initial reference is made to FIG. 1 showing a passenger compartment 12 and an engine compartment 13 in a vehicle 11. A driver 15 seated on a seat 14 is shown in the passenger compartment 12. An engine 16 is disposed in the engine compartment 13. A driving force transmission mechanism for transmitting output power from the engine 16 is not shown.

Components connected to an air-conditioning system 17 will now be described. First, an engine cooling system will be described. A radiator 18 and a radiator fan 19 are disposed in front of the engine 16 (on the left in FIG. 1). Coolant passages 20, 21 are formed inside the engine 16, and coolant pipes 22, 23 are provided between the engine 16 and the radiator 18. The coolant passage 20 in the engine 16, the coolant pipe 22, the radiator 18, the coolant pipe 23, and the coolant passage 21 form in this order a coolant circulating path (engine coolant circuit). The coolant pipe 23 located downstream of the radiator 18 is connected to the coolant passage 21 so that a low-temperature coolant cooled by the radiator 18 flows therethrough. The coolant pipe 22 located upstream of the radiator 18 is connected to the coolant passage 20 so that a high-temperature coolant (hot water) heated by the engine 16 flows therethrough. The coolant passages 20, 21 are connected inside the engine 16. The circulation of a coolant as described above is produced by a coolant pump 24 provided in the coolant pipe 23, for example.

In the above engine cooling system, a coolant circulates the engine coolant circuit, and the coolant (hot water) absorbing heat generated by the engine 16 is cooled by the radiator 18 to a low temperature, and then is supplied to the engine 16 again. In this manner, the coolant circulates the engine coolant circuit, continuously cooling the engine 16.

The air-conditioning system 17 includes a heater core pipe 31 connected to the coolant passage 20, and a heater core pipe 32 connected to the coolant passage 21 via the coolant pump 24. The pipes 31 and 32 form a hot water circulating path (heater circuit) via the heater core 33. The heater core 33 is a heat exchanger. A water valve 34 is provided in the heater core pipe 31 in the circulating path. The heater core 33 is disposed in an air-conditioning duct 35.

Figure 2:
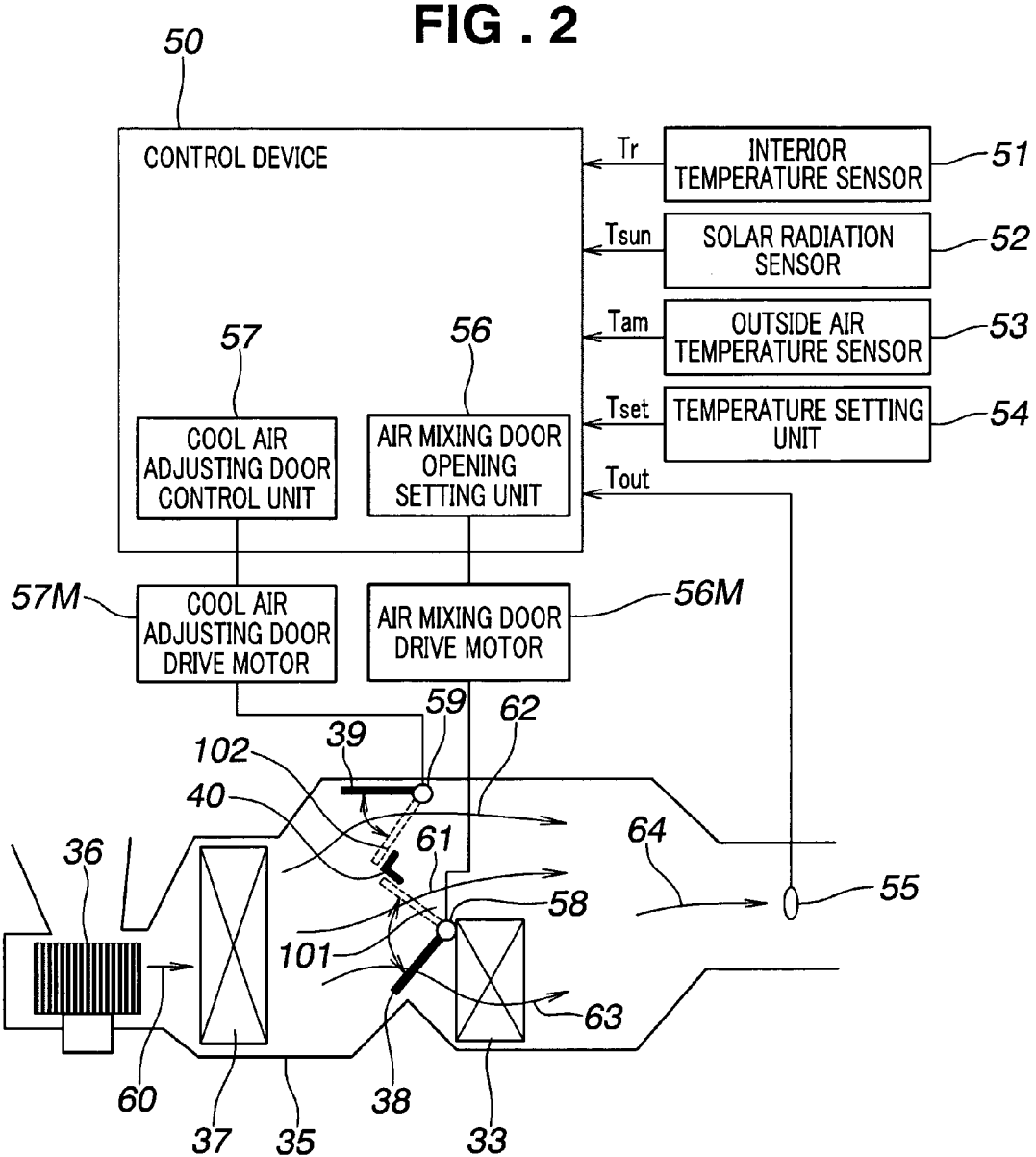
FIG. 2 is a diagram illustrating the configuration of the vehicle air-conditioning system shown in FIG. 1.

The air-conditioning duct 35 is provided, downstream from the engine compartment 13, with a fan 36, an evaporator (interior heat exchanger) 37, an openable-closable air mixing door 38, an openable-closable cool air adjusting door 39, the heater core 33, a bifurcating portion 40 which allows a passage portion for bypassing the heater core 33 to be further divided into two passages (a first bypass passage 101 and a second bypass passage 102 shown in FIG. 2) in conjunction with opening and closing operations of the air mixing door 38 and the cool air adjusting door 39, and outlets 41, 42. The evaporator 37 cools air supplied from the fan (blower) 36. The outlet 41 is a vent outlet, and the outlet 42 is a foot outlet.

The air-conditioning duct 35 is divided, by the air mixing door 38, into a portion which allows air passing through the air conditioning duct 35 to pass through the heater core 33 (heated air, an air portion 63 shown in FIG. 2), and a portion which allows the air to bypass the heater core 33 (unheated air, an air portion 61 through the first bypass passage 101 in FIG. 2). For the unheated air (cool air) as the portion bypassing the heater core 33, the second bypass passage 102 which is different from the first bypass passage 101 is provided. The air portion 62 flows through the second bypass passage 102. In the second bypass passage 102, the amount of the air portion 62 can be adjusted by the cool air adjusting door 39. The unheated air is divided into the air portion 62, the amount of which is adjusted by the cool air adjusting door 39 and the bifurcating portion 40, and the air portion 61 caused to bypass the heater core 33 by the air mixing door 38. With this structure of the air-conditioning duct 35, temperature-adjusted air can be supplied into the passenger compartment 12. In FIG. 1, reference numeral 43 denotes a partition wall separating the passenger compartment 12 from the engine compartment 13.

In the above air-conditioning system 17, hot air heated by engine heat in the engine coolant circuit is delivered to the heater circuit for circulation. Under this hot water circulation, air passing through the heater core 33 can be heated there, and warm air can be supplied to the passenger compartment 12. The amount of the warm air is adjusted appropriately by the air mixing door 38 which adjusts the mixing ratio between air passing through the heater core 33 and air bypassing the heater core 33, to adjust the temperature of air discharged through the outlets. In addition, the amount of cool air is further finely adjusted by the cool air adjusting door 39 which forms the additionally provided second bypass passage 102, to more precisely adjust the discharge temperature closer to the set temperature.

FIG. 2 is a diagram illustrating the structure including a control system of the vehicle air-conditioning system 17 according to the present invention. The structure of a portion of the air-conditioning duct 35 related to the air-conditioning system 17 is as described above. The same elements as those illustrated in FIG. 1 are given the same reference numerals. Referring to FIG. 2, the air-conditioning system 17 is further provided with an outlet temperature sensor 55 for detecting the temperature of air at each outlet, a rotating mechanism 58 which allows the air mixing door 38 to open and close, an air mixing door drive motor 56M for changing the opening of the air mixing door 38, a rotating mechanism 59 which allows the cool air adjusting door 39 to open and close, and a cool air adjusting door drive motor 57M for changing the opening of the cool air adjusting door 39.

A control device 50 includes an air mixing door opening setting unit 56 for transmitting a drive command signal to the air mixing door drive motor 56M, and a cool air adjusting door control unit 56 for transmitting a drive command signal to the cool air adjusting door drive motor 57M. The control device 50 is implemented by an in-vehicle computer borne on the vehicle 11 (see FIG. 1).

Air 60 discharged from the fan of the blower 36 passes through the evaporator 37, being cooled. The cooled air is divided into the portion (heated air) 63 passing through the heater core 33 and the portions 61, 62 (unheated air) bypassing the heater core 33, depending on the opening of the air mixing door 38. The unheated air is further divided into the air portion 62, the amount of which is adjusted by the cool air adjusting door 39, and the air portion 61 caused to bypass the heater core 33 by the air mixing door 38. The mixing ratio between the heated air 63 and the unheated air (61, 62) is changed depending on the opening position of the air mixing door 38. The amount of the air portion 62 of unheated air is further finely adjusted with a high precision by the cool air adjusting door 39.

The opening of the air mixing door 38 is determined in the range from an angle (0%) at which to fully close the passage for passing through the heater core 33 to an angle (100%) at which to fully close the passage for bypassing the heater core 33. The opening of the cool air adjusting door 39 is initially maintained at a predetermined degree of opening according to the temperature of outside air. When fine adjustment through feedback control of the discharge temperature becomes necessary, the cool air adjusting door 39 is driven in the range from an angle (0%) at which to fully close the passage of the cool air 62 to an angle (100%) at which to fully open the passage.

The operation of the air mixing door drive motor 56M for changing the opening of the air mixing door 38 is controlled by a drive command signal supplied from the air mixing door opening setting unit 56 in the control device 50. The operation of the drive motor 57M for changing the opening of the cool air adjusting door 39 is controlled by a drive command signal supplied from the cool air adjusting door control unit 57 in the control device 50.

The control device 50 receives, as input signals, $T_r$ (a signal on the air temperature in the passenger compartment) from an interior temperature sensor 51, $T_{sun}$ (a signal on the amount of solar radiation into the passenger compartment) from a solar radiation sensor 52, $T_{am}$ (a signal on the temperature of air outside the passenger compartment) from an outside air temperature sensor 53, $T_{set}$ (a signal on the set temperature of air inside the passenger compartment) from a temperature setting unit 54, and $T_{out}$ (a signal on the temperature of air at each outlet) from the outlet temperature sensor 55. $T_{set}$ is a set temperature set by the driver 15, and $T_r$, $T_{sun}$, $T_{am}$ and $T_{out}$ are detection signals supplied from the corresponding sensors 51, 52, 53 and 55.

Upon receiving the various signals as described above, the control device 50 controls the opening of the air mixing door 38 and the opening of the cool air adjusting door 39, based on a control flow and a relational expression as will be described below.

Figure 3:
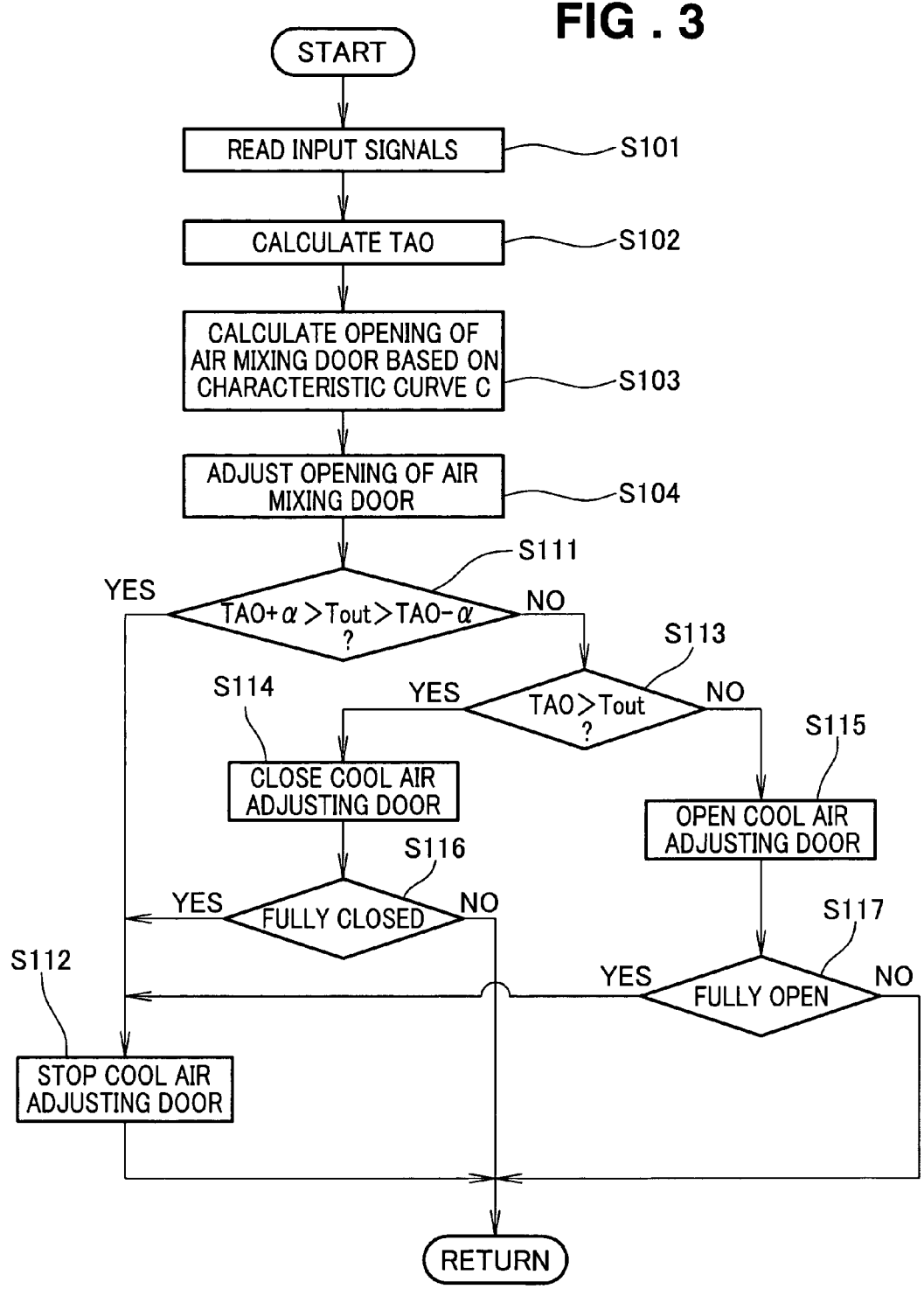
FIG. 3 is a flowchart illustrating the process of controlling drive of an air mixing door and a cool air adjusting door in the vehicle air-conditioning system according to the present invention.

Next, with reference to FIGS. 2 and 3, the process of controlling the opening of the air mixing door 38 and the cool air adjusting door 39 based on control by the control device 50 will be described. FIG. 3 shows a flowchart on how to determine the opening of the air mixing door 38 when its opening and closing operation is controlled, and feedback control with the cool air adjusting door 39. It is an important matter in the flow of this control process how to control the opening of the cool air adjusting door 39 especially when the opening of the air mixing door 38 comes close to a predetermined angle (θ1 described below) and becomes smaller than that.

Before describing the control process, the basic idea of the control according to the present invention will be described by pointing out problems with reference to FIG. 4.

Figure 4:
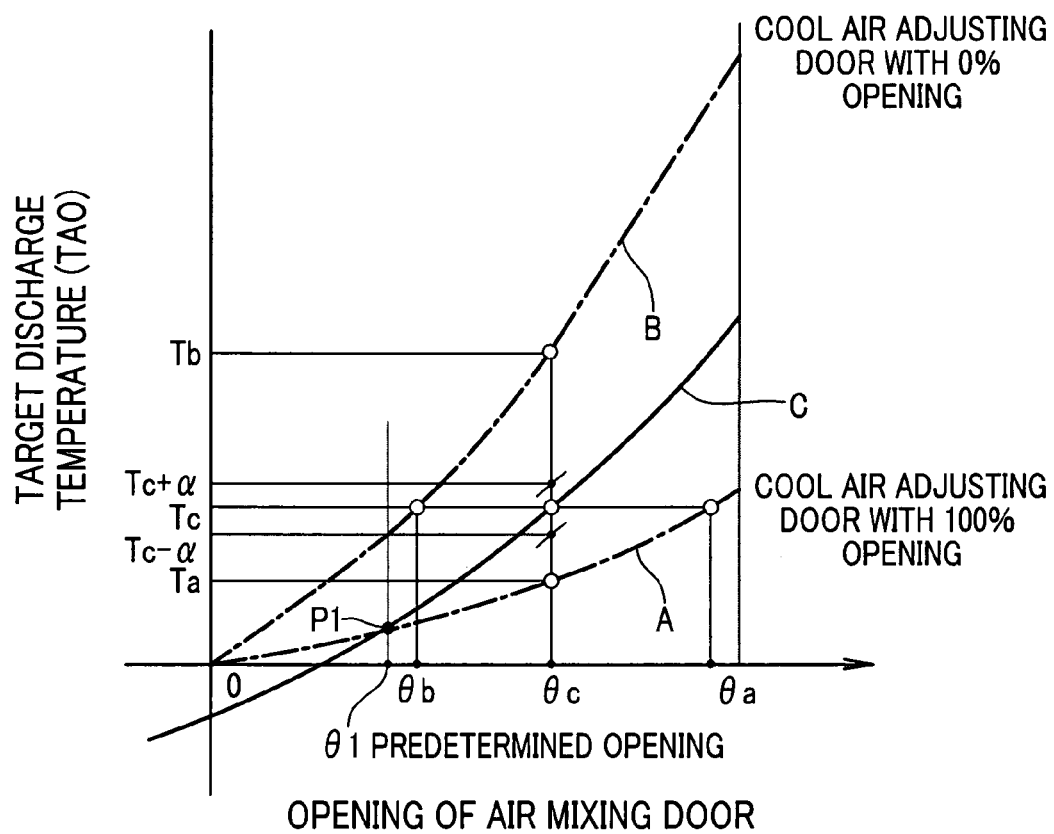
FIG. 4 is a graph showing the relationships between the opening of the cool air adjusting door, the opening of the air mixing door, and target discharge temperature, for illustrating the basic idea of control in the vehicle air-conditioning system according to the present invention.

In the coordinate system of the graph shown in FIG. 4, the horizontal axis indicates the opening of the air mixing door 38, and the vertical axis indicates target discharge temperature (TAO). Characteristic curves A, B and C shown in FIG. 4 each indicate the relationship between the target discharge temperature and the opening of the air mixing door 38. The characteristic curve A indicates the relationship of the opening of the air mixing door 38 with the target discharge temperature when the initial opening of the cool air adjusting door 39 is in a fully open state (100%). The characteristic curve B indicates the relationship of the opening of the air mixing door 38 with the target discharge temperature when the initial opening of the cool air adjusting door 39 is in a fully closed state (0%).

When the characteristic curves A and B shown in FIG. 4 are compared for consideration, it is found that even when the same target discharge temperature is achieved, the opening of the air mixing door 38 differs depending on the initial opening of the cool air mixing door 39. For example, at the target discharge temperature Tc, the opening of the air mixing door 38 in the characteristic curve A is θa, and the opening of the air mixing door 38 in the characteristic curve B is θb. On the other hand, when the opening of the air mixing door 38 is between θa and θb, the opening of the cool air adjusting door 39 can be changed to adjust discharge temperature. As described above, even when the target discharge temperature is held constant, the opening of the air mixing door 38 differs depending on the initial opening of the cool air adjusting door 39. Its characteristic feature is that as the initial opening of the cool air adjusting door 39 is increased, the opening of the air mixing door 38 can be increased to obtain a target discharge temperature.

In the characteristic curves A and B shown in FIG. 4, when the opening of the air mixing door 38 is fixed at a certain degree of opening (e.g., θc), a discharge temperature adjustment based on a change of the opening of the cool air adjusting door 39 is made in the range from a discharge temperature Ta at which the cool air adjusting door 39 is fully open (100%) to a discharge temperature Tb at which the cool air adjusting door 39 is fully closed (0%). Under the feedback control with the cool air adjusting door 39, the cool air adjusting door 39 is stopped when the discharge temperature falls within a predetermined temperature range (±α) with respect to a target discharge temperature.

As is clear from the characteristic curves A and B, as the target discharge temperature is lowered and the opening of the air mixing door 38 is reduced, the range of discharge temperature adjustment (Tb–Ta) by the cool air adjusting door 39 is narrowed. In contrast, the above-described predetermined temperature range (±α) is constant independently of the opening of the air mixing door 38.

Consequently, as the opening of the air mixing door 38 is reduced, the predetermined temperature range (±α) becomes greater relative to the range of discharge temperature adjustment (Tb–Ta) by the cool air adjusting door 39, and the proportion of the stopping range (±α) of the cool air adjusting door 39 in which to obtain the target discharge temperature TAO becomes greater. This indicates the above-described problem that when the opening of the air mixing door 38 is small, the amount of air discharged from the outlet is not steady.

In this connection, in the present invention, a characteristic curve C relating the relationship between the target discharge temperature and the opening of the air mixing door 38 is provided, and the opening of the cool air adjusting door 39 is controlled according to the characteristic curve C based on the relationship between the target discharge temperature and the opening of the air mixing door 38. The characteristic curve C is determined such that when the opening of the air mixing door 38 is sufficiently large, the initial opening of the cool air adjusting door 39 is set at a degree of opening (e.g., a degree of about 50% opening) with which a sufficient adjustable range is provided both in an opening direction and in a closing direction; as the target discharge temperature is lowered and the opening of the air mixing door 38 is reduced, the initial opening of the cool air adjusting door 39 is gradually increased; when the opening of the air mixing door 38 reaches a predetermined degree of opening θ1 as will be described below, the cool air adjusting door 39 is fully open (point P1). Also, when the air mixing door 38 is rotated in a closing direction and its opening becomes smaller than the predetermined opening θ1, the target discharge temperature TAO in the characteristic curve C is lower than that in the characteristic curve A with the cool air adjusting door 39 fully open. Thus, the characteristic curve C crosses the characteristic curve A at the predetermined degree of opening θ1 of the air mixing door 38.

The predetermined degree of opening θ1 will now be described. Under the feedback control with the cool air adjusting door 39, when the difference between the target discharge temperature TAO and the discharge temperature $T_{out}$ falls within the predetermined temperature range (±α), the cool air adjusting door 39 is controlled to stop. When the target discharge temperature TAO is lowered, the opening of the air mixing door 38 is also reduced. In the area in which the opening of the air mixing door 38 is small, the amount of change of the discharge temperature $T_{out}$ changed by rotation of the cool air adjusting door 39 is small, so that the opening of the cool air adjusting door 39 at the stopped position is in the wide range from the open side to the closed side. Therefore, when the cool air adjusting door 39 is stopped on the open side, resistance in the passage is small, and air flows smoothly, however, when it is stopped on the closed side, resistance in the passage is greater, and an airflow is interrupted, resulting in an unsteady amount of air. Especially when the stopping range (±α) of the cool air adjusting door 39 is about one-third of the above-described range (Tb–Ta) from the fully closed state to the fully open state, the amount of air becomes unsteady as described above. Against this, the opening θ1 of the air mixing door 38 is set as the predetermined degree of opening, beyond which the proportion of the stopping range of the cool air adjusting door 39 becomes larger and the amount of air starts being unsteady.

Next, the flowchart shown in FIG. 3 will be described on the basis of the above-described idea of control.

In the first step S101, various input signals are read. Here, the input signals read are the above-described $T_r$, $T_{sun}$, $T_{am}$, $T_{set}$ and $T_{out}$.

In step S102, the target discharge temperature (TAO) is calculated based on the following expression 1 using the above input signals:

$$TAO = K_{set}*T_{set} - K_r*T_r - K_{am}*T_{am} - K_{sun}*T_{sun} + C \quad (1)$$

$T_{set}$: the set temperature of air in the passenger compartment $T_r$: the temperature of air in the passenger compartment $T_{am}$: the temperature of air outside the passenger compartment $T_{sun}$: the amount of solar radiation into the passenger compartment $K_{set}$, $K_r$, $K_{am}$, $K_{sun}$, C: control constants

*: multiple mark

In step S103, based on the figure of the target discharge temperature TAO calculated in step S102, the opening of the air mixing door 38 is calculated according to the characteristic curve C shown in FIG. 4.

In step S104, according to the calculated opening of the air mixing door 38, the opening of the air mixing door 38 is adjusted through the air mixing door drive motor 56M.

The opening of the air mixing door 38 calculated as described above is the value calculated on the assumption that the opening of the cool air adjusting door 39 changes along the characteristic curve C. Therefore, in subsequent control process steps, details of the control process consequently change depending on whether the calculated opening of the air mixing door 38 is greater than the predetermined degree of opening (θ1) or equal to or smaller than the predetermined degree of opening (θ1).

First, description will be made on the case where the opening of the air mixing door 38 is greater than the predetermined degree of opening (θ1).

When the opening of the air mixing door 38 is greater than the predetermined degree of opening θ1, the temperature of air at the outlet obtained only by adjusting the opening of the air mixing door 38 is near the target discharge temperature TAO. This is because the air mixing door 38 has the function of dividing air passing through the duct into the heated air 63 passing through the heater core 33 and the unheated air 61, 62 bypassing the heater core 33, and a temperature close to the target discharge temperature TAO is achieved by the air mixing door 38.

Then, the discharge temperature $T_{out}$ supplied from the outlet temperature sensor 55 is compared with the target discharge temperature TAO (step S111), and the opening of the cool air adjusting door 39 is also adjusted to bring the temperature at the outlet closer to the target discharge temperature TAO. When the discharge temperature $T_{out}$ falls within the predetermined range (±α) with respect to the target discharge temperature TAO, or is substantially the same (step S111), the cool air adjusting door 39 is stopped, or maintained in its stopped state when already stopped (step S121).

When the discharge temperature $T_{out}$ is different from the target discharge temperature TAO (step S111), and the target discharge temperature TAO is higher than the discharge temperature $T_{out}$ (step S113), the opening of the cool air adjusting door 39 is adjusted in the closing direction (step S114). At that time, fine adjustment according to the temperature difference is preferred. When the comparison shows that the target discharge temperature TAO is lower than the discharge temperature $T_{out}$ (step S113), the opening of the cool air adjusting door 39 is adjusted in the opening direction (step S115).

When the opening of the air mixing door 38 is greater than the predetermined opening θ1, the cool air adjusting door 39 is in an open state with a required degree of opening according to the characteristic curve C in early stages. Therefore, even when the discharge temperature is higher or lower than the target discharge temperature, the opening of the cool air adjusting door 39 can be adjusted either in the closing direction or in the opening direction to finely adjust the temperature by increasing or lowering it. In the subsequent decision step S116 or S117, the opening of the cool air adjusting door 39 is neither fully closed nor fully open. The process thus proceeds to Return so as to continue the fine adjustment of the opening of the cool air adjusting door 39.

When it is determined that the opening of the cool air adjusting door 39 is fully closed or fully open in the decision step S116 or S117, the opening of the cool air adjusting door 39 cannot be adjusted further, and comes into a stopped state (step S112).

In the decision step Sill, the decision can alternatively be made based on whether the discharge temperature Tout agrees with the target discharge temperature TAO or not. When the decision is made based on whether the discharge temperature $T_{out}$ is within the predetermined range or not as described above, the discharge temperature $T_{out}$ is feedback controlled to constantly fall within the predetermined temperature range (±α) with respect to the target discharge temperature TAO, and the cool air adjusting door 39 is adjusted about the initial opening.

Next, description will be made on the case where the opening of the air mixing door 38 is equal to or smaller than the predetermined degree of opening (θ1).

In this case, the control process steps are basically the same as the above-described steps S111 to S117. When the opening of the air mixing door 38 is equal to or smaller than the predetermined degree of opening θ1, the opening of the cool air adjusting door 39 determined based on the characteristic curve C is already fully open (100%), as described above. Therefore, the discharge temperature $T_{out}$ does not fall within the predetermined temperature range (±α) with respect to the target discharge temperature TAO. In the decision step S111, the decision is normally NO. Then, the next decision step S113 is performed. At that time, the opening of the cool air adjusting door 39 is already fully open, the air temperature $T_{out}$ at the outlet obtained only by adjusting the opening of the air mixing door 38 is higher than the target discharge temperature TAO. Thus, in decision step S113, the decision is NO. In the next step S115, control of increasing the opening of the cool air adjusting door 39 is further performed so as to lower the temperature at the outlet. However, the cool air adjusting door 39 is already fully open. Thus, based on the next decision step S117, the cool air adjusting door 39 continues to be stopped in the fully-open position (step S112).

In the above state, the temperature of air at the outlet is higher than the target discharge temperature TAO. However, to begin with, a temperature lower than the temperature of air passing through the evaporator 37 cannot be achieved even by adjusting the opening of the air mixing door 38. Therefore, when the cool air adjusting door 39 is fully open and the opening of the air mixing door 38 is equal to or smaller than the predetermined degree of opening (θ1), the temperature of air at the outlet is slightly different from the temperature of air passing through the evaporator 37, and causes no problem.

The structure, form, size and positional relationships illustrated in the above embodiment are only schematically shown to the extent that the present invention can be understood and implemented, and are only typical examples. Thus, the present invention is not limited to the above-described embodiment, and can be modified into various forms without departing from the scope of the technical idea as defined by the appended claims.

As described above, the present invention can be used in a vehicle air-conditioning system for dividing air passing through an air-conditioning duct into heated air passing through a heater core and unheated air bypassing the heater core by an air mixing door, and used for controlling discharge temperature with high precision and discharging a steady amount of air when the opening of an air mixing door is small.

Obviously, various minor changes and modifications of the present invention are possible in the light of the above teaching. It is therefore to be understood that within the scope of the appended claims the invention may be practiced otherwise than as specifically described.

What is claimed is:

1. A vehicle air-conditioning system including an air-conditioning duct with an outlet, an air-cooling evaporator and an air-heating heater core which are disposed in the air-conditioning duct, an air mixing door for dividing air passing through the air-conditioning duct into heated air passing through the heater core and into unheated air bypassing the heater core, the air mixing door defining a first bypass passage, a discharge temperature sensor for detecting the temperature of air at the outlet, and a control device for performing feedback control to bring the temperature detected by the discharge temperature sensor closer to a target discharge temperature, the system comprising:
   a second bypass passage separate from the first bypass passage;
   a cool air adjusting door for adjusting the amount of air flowing through the second bypass passage;
   an air mixing door opening setting means for setting the degree of opening of the air mixing door so that air having the target discharge temperature is obtained, with the cool air adjusting door open at an initial degree of opening; and
   a cool air adjusting door control means for controlling the opening of the cool air adjusting door so that the temperature detected by the discharge temperature sensor comes closer to the target discharge temperature,
   wherein the cool air adjusting door control means causes the cool air adjusting door to be fully open when the degree of opening of the air mixing door determined by the air mixing door opening setting means is equal to or smaller than a predetermined degree of opening.

2. An air-conditioning system as set forth in claim 1, wherein the initial degree of opening of the cool air adjusting door is set closer to full opening as the degree of opening of the air mixing door determined by the air mixing door opening setting means becomes closer to the predetermined degree of opening.

* * * * *